United States Patent
Edmond et al.

(10) Patent No.: US 10,962,116 B2
(45) Date of Patent: Mar. 30, 2021

(54) SEAL

(71) Applicant: Claverham Limited, Shirley (GB)

(72) Inventors: George Edmond, Yatton (GB); Simon Ennor, Clevedon (GB); Jonathan Robins, Clevedon (GB); Paul Bowles, North Somerset (GB); Pawel Kwasniewski, Olawa (PL)

(73) Assignee: CLAVERHAM LIMITED, Bristol (GB)

( * ) Notice: Subject to any disclaimer, the term of this patent is extended or adjusted under 35 U.S.C. 154(b) by 336 days.

(21) Appl. No.: 16/047,391

(22) Filed: Jul. 27, 2018

(65) Prior Publication Data
US 2019/0032785 A1    Jan. 31, 2019

(30) Foreign Application Priority Data

Jul. 28, 2017 (EP) .................. 17183854

(51) Int. Cl.
| | |
|---|---|
| *F16J 15/32* | (2016.01) |
| *F16J 15/3232* | (2016.01) |
| *F16K 37/00* | (2006.01) |
| *F16K 41/04* | (2006.01) |
| *F16K 1/226* | (2006.01) |
| *F16J 15/00* | (2006.01) |

(52) U.S. Cl.
CPC ......... *F16J 15/3232* (2013.01); *F16J 15/004* (2013.01); *F16K 1/2268* (2013.01); *F16K 37/0066* (2013.01); *F16K 41/046* (2013.01)

(58) Field of Classification Search
CPC ............................. F16J 15/3232; F16J 15/004
See application file for complete search history.

(56) References Cited

U.S. PATENT DOCUMENTS

| | | | |
|---|---|---|---|
| 2,703,974 A | 3/1955 | Clark | |
| 3,626,770 A * | 12/1971 | Lindberg | ............ F16J 15/56 277/320 |
| 4,254,793 A * | 3/1981 | Scaramucci | ........ F16K 5/0673 137/246.22 |

(Continued)

FOREIGN PATENT DOCUMENTS

FR        2977650 A1      1/2013

OTHER PUBLICATIONS

Extended European Search Report for International Application No. 17183854.3 dated Feb. 5, 2018, 5 pages.

*Primary Examiner* — Vishal A Patel
(74) *Attorney, Agent, or Firm* — Cantor Colburn LLP

(57) ABSTRACT

A rotary seal comprises a seal element comprising a disc-shaped body having a first axial side and an opposed second axial side. The seal element further comprises a radially inner central circular opening for receiving a rotary shaft, the opening having an inner periphery for sealing engagement with the shaft. A radially outer rim portion of the seal element comprises an axially facing annular sealing surface provided on the first axial side for sealing engagement in use with an opposed axially facing sealing surface of an adjacent first static housing and an axially facing pocket provided on the second axial side and having an axially facing surface for receiving, in use, an annular elastomeric biasing element. At least one drainage passage is formed through the outer rim portion from an inlet on the second axial side to an outlet on a radially outer portion of the rim portion.

14 Claims, 3 Drawing Sheets

(56) References Cited

U.S. PATENT DOCUMENTS

| | | | |
|---|---|---|---|
| 4,406,459 A * | 9/1983 | Davis | F16J 15/3404 |
| | | | 277/401 |
| 4,406,460 A * | 9/1983 | Slayton | F16J 15/164 |
| | | | 277/401 |
| 4,928,978 A * | 5/1990 | Shaffer | F01D 25/183 |
| | | | 277/401 |
| 6,472,786 B1 | 10/2002 | McCauley et al. | |
| 7,265,468 B1 | 9/2007 | Mancl | |
| 9,562,608 B2 | 2/2017 | Kimura et al. | |
| 10,352,456 B2 * | 7/2019 | Amador | F16J 15/342 |
| 10,422,245 B2 * | 9/2019 | Cigal | F16J 15/3404 |
| 2004/0021007 A1 | 2/2004 | Hakala | |
| 2008/0110515 A1 | 5/2008 | Angelosanto et al. | |
| 2018/0355757 A1 * | 12/2018 | Walker | F01D 11/003 |
| 2019/0154156 A1 * | 5/2019 | Sakakura | F16J 15/3436 |

\* cited by examiner

SEAL

FOREIGN PRIORITY

This application claims priority to European Patent Application No. 17183854.3 filed Jul. 28, 2017, the entire contents of which is incorporated herein by reference.

TECHNICAL FIELD

The present disclosure relates to seals, and in particular, but not exclusively to moisture seals for use in rotary actuators and systems.

BACKGROUND

Rotary actuators are used in a wide range of applications. One such application is in the actuation of butterfly valves in aircraft air conditioning systems. Typically, a butterfly valve element is arranged within an air flow duct, with the rotary actuator being mounted externally of the duct and driving a shaft which extends through a wall of the duct to rotate the valve element thereby controlling and regulating the airflow within the duct.

Although a seal is provided between the duct and the shaft, under certain operating conditions during a flight envelope, moisture may move from the duct, through the seal and along the shaft towards the actuator drive unit. Although the actuator drive unit is protected by a secondary seal, during freeze/thaw cycles, water may be able to move past this seal and enter the actuator drive unit. This is undesirable since it may contaminate electronic components of the drive unit, leading to corrosion on exposed electrical interfaces and possibly electrical breakdown leading to system error messages, requiring the drive unit to be removed from the aircraft for attention.

SUMMARY

From a first aspect, the disclosure provides a rotary seal comprising a seal element having a disc-shaped body with a first axial side and an opposed second axial side. The seal element further comprises a radially inner central circular opening for receiving a rotary shaft, the opening having an inner periphery for sealing engagement with the shaft. The seal element further comprises a radially outer rim portion having an axially facing annular sealing surface provided on the first axial side for sealing engagement in use with an opposed axially facing sealing surface of an adjacent first static housing, an axially facing pocket provided on the second axial side and having an axially facing surface for receiving, in use, an annular elastomeric biasing element, and at least one drainage passage formed through the outer rim portion from an inlet on the second axial side to an outlet on a radially outer portion of the rim portion to provide a fluid drainage path through the rim portion bypassing the axially facing pocket.

In embodiments of the disclosure, comprising a plurality of, for example at least four, drainage passages may be arranged circumferentially around the seal element.

The drainage passages may be circumferentially equi-spaced around the seal element.

In embodiments of any of the above, the axially facing pocket may comprise a radially inner, axially extending lip.

In various embodiments, a drainage passage inlet may be formed at the base of the axially extending lip.

In embodiments of any of the above, the axially facing annular sealing surface may comprise an annular groove formed therearound.

In embodiments of any of the above, the at least one drainage passage may extend at an angle to a radial direction.

In embodiments of any of the above, the seal element may be made from PTFE or a PTFE based material.

In embodiments of any of the above, the seal may further comprise an annular elastomeric biasing element received in the pocket.

The disclosure also provides a rotary sealing arrangement comprising:

a first static housing comprising a first axially facing sealing surface, a second static housing comprising a second axially facing surface and a rotary shaft (8) extending axially through at least a portion of the first and second static housings. The sealing arrangement also comprises a rotary seal as described above arranged between the first and second static housings, the inner periphery of the seal element being in a sealing relation with respect to the shaft. The annular elastomeric biasing element is axially compressed between the axially facing surface of the pocket and the axially facing surface of the second housing thereby biasing the axially facing sealing annular surface of the rim portion of the seal element into sealing engagement with the first axially facing sealing surface of the first static housing.

Embodiments of the above may comprise a first additional seal between the first static housing and the shaft and a second additional seal between the second static housing and the shaft, the seal element being arranged between the first and second additional seals.

In embodiments of any of the above may comprise a clamping element for clamping the first static housing to the second static housing, thereby compressing the annular elastomeric biasing element.

The disclosure also provides a rotary actuator system comprising a rotary actuator, a rotary shaft driven by the rotary actuator, a rotary valve element coupled to the rotary shaft and a rotary sealing arrangement as described above, wherein the rotary actuator comprises the first static housing, the rotary valve comprises the second static housing and the seal element seals with the rotary shaft.

In embodiments of any the above, the rotary valve element may be is a butterfly valve.

The disclosure also provides an aircraft air conditioning system comprising a rotary actuator system as described above for controlling flow of air therein.

BRIEF DESCRIPTION OF DRAWINGS

An embodiment of the disclosure will now be described by way of example only with reference to the accompanying drawings in which.

DETAILED DESCRIPTION

Figure 1:
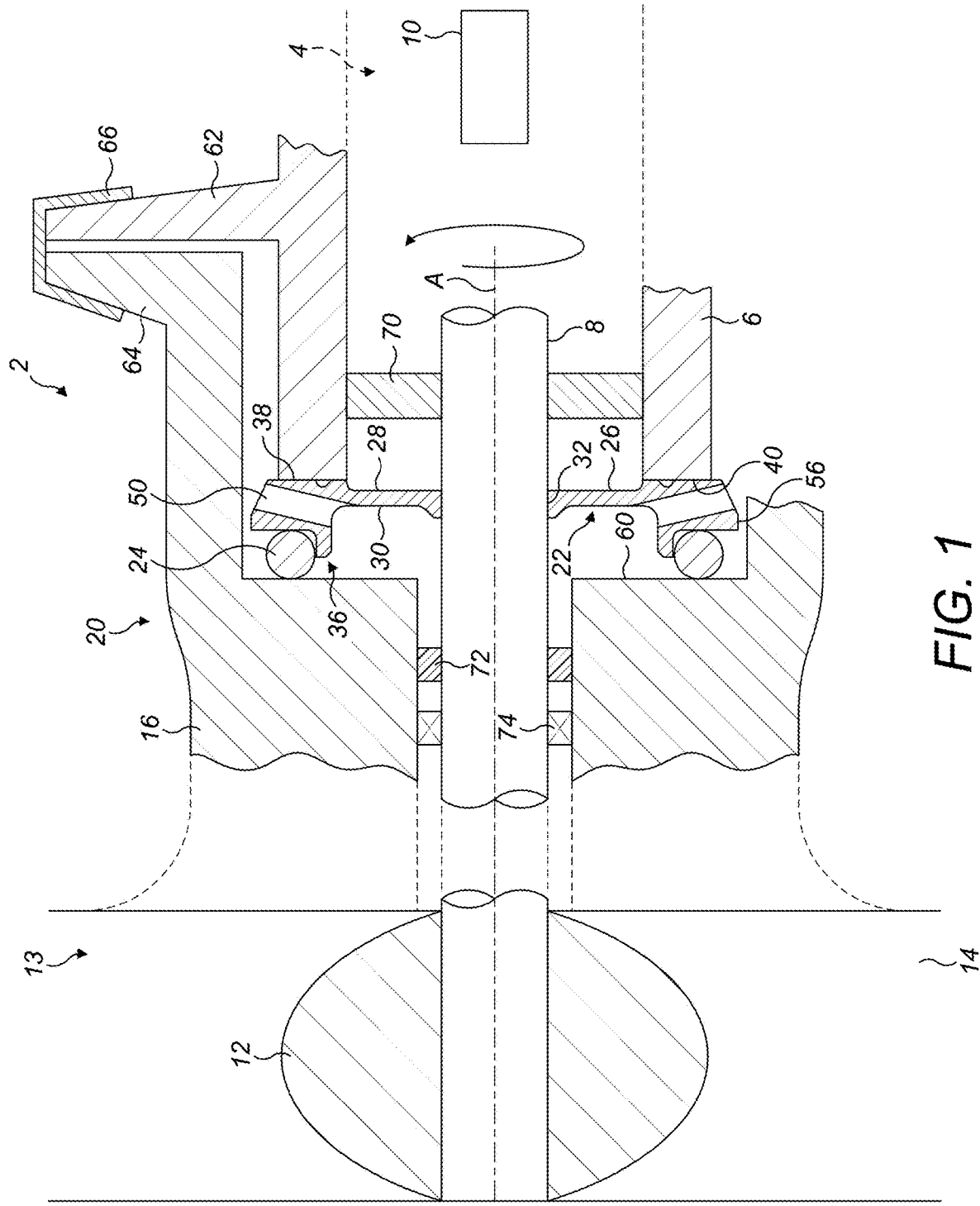
FIG. 1 illustrates, schematically, a rotary actuator system in accordance with the disclosure.

With reference to FIG. 1, a valve operating system 2 comprises a rotary actuator 4 having a first static, actuator housing 6. A rotary shaft 8 is connected to a rotary drive element mechanism within the actuator housing 6. In one example, the shaft 8 may have a keyed connection with a drive component within the actuator housing 6. The rotary actuator 4 may include, for example, electronic components 10 arranged within the actuator housing 6 allowing for, for example, the control of the actuator 4.

The rotary shaft 8 in this embodiment is connected at its other end to a valve element 12 of a valve 13. In this embodiment, the valve element 12 is a butterfly valve element which is received in a duct 14 to control the flow of fluid through the duct 14. The duct 14 may, for example, be part of an aircraft air conditioning system, the butterfly valve element 12 controlling the flow of air through the duct 14. The valve element 12 is supported in a second static, valve housing 16 which may, for example, be integrated with a wall of the duct 14. In certain embodiments, the rotary shaft 8 may form a part of the valve assembly and project therefrom for engagement with the actuator 4 as discussed above.

The actuator system 2 further comprises a sealing arrangement 20 arranged between the actuator housing 6 and the housing 16. The sealing arrangement 20 comprises a seal element 22 and an annular elastomeric biasing element 24.

Figure 2:
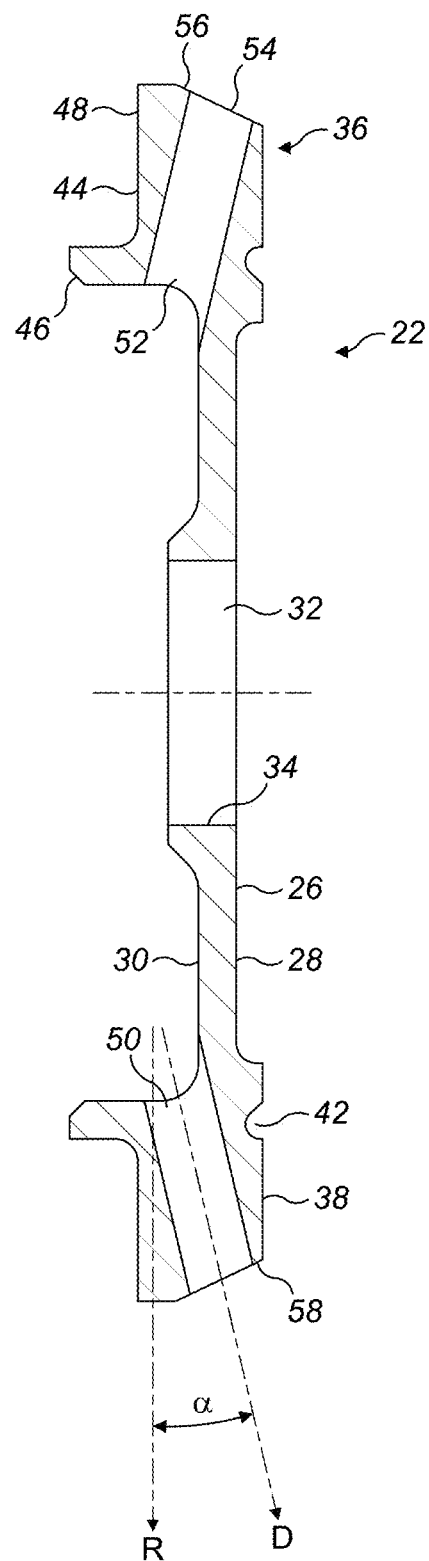
FIG. 2 shows a cross-sectional view of a seal element in accordance with the disclosure.

As shown in more detail in FIG. 2, the seal element 22 comprises a disc-shaped seal body 26 having a first axial side 28 and an opposed second axial side 30. The seal body 26 further comprises a radially inner central circular opening 32 for receiving the rotary shaft 8. The opening 32 has an inner periphery 34 for sealingly receiving the shaft 8.

The seal body 26 further comprises a radially outer rim portion 36. The radially outward rim portion 36 has an axially facing annular sealing surface 38 provided on the first axial side 28 of the seal body for sealing engagement with an axially facing annular surface 40 of the adjacent first static housing 6. The axially facing annular sealing surface 38 of the seal element 22 is arranged generally perpendicularly to the axis of rotation A of the rotary shaft 8 and of the central opening 32 of the seal body 26. The axially facing surface 40 of the first static housing is also arranged perpendicularly to the axis of rotation A. The axially facing annular sealing surface 38 of the seal element 22 further comprises an annular groove 42 which extends in a circumferential direction around the axially facing annular surface 38. The purpose of this groove 42 will be described further below.

Figure 3:
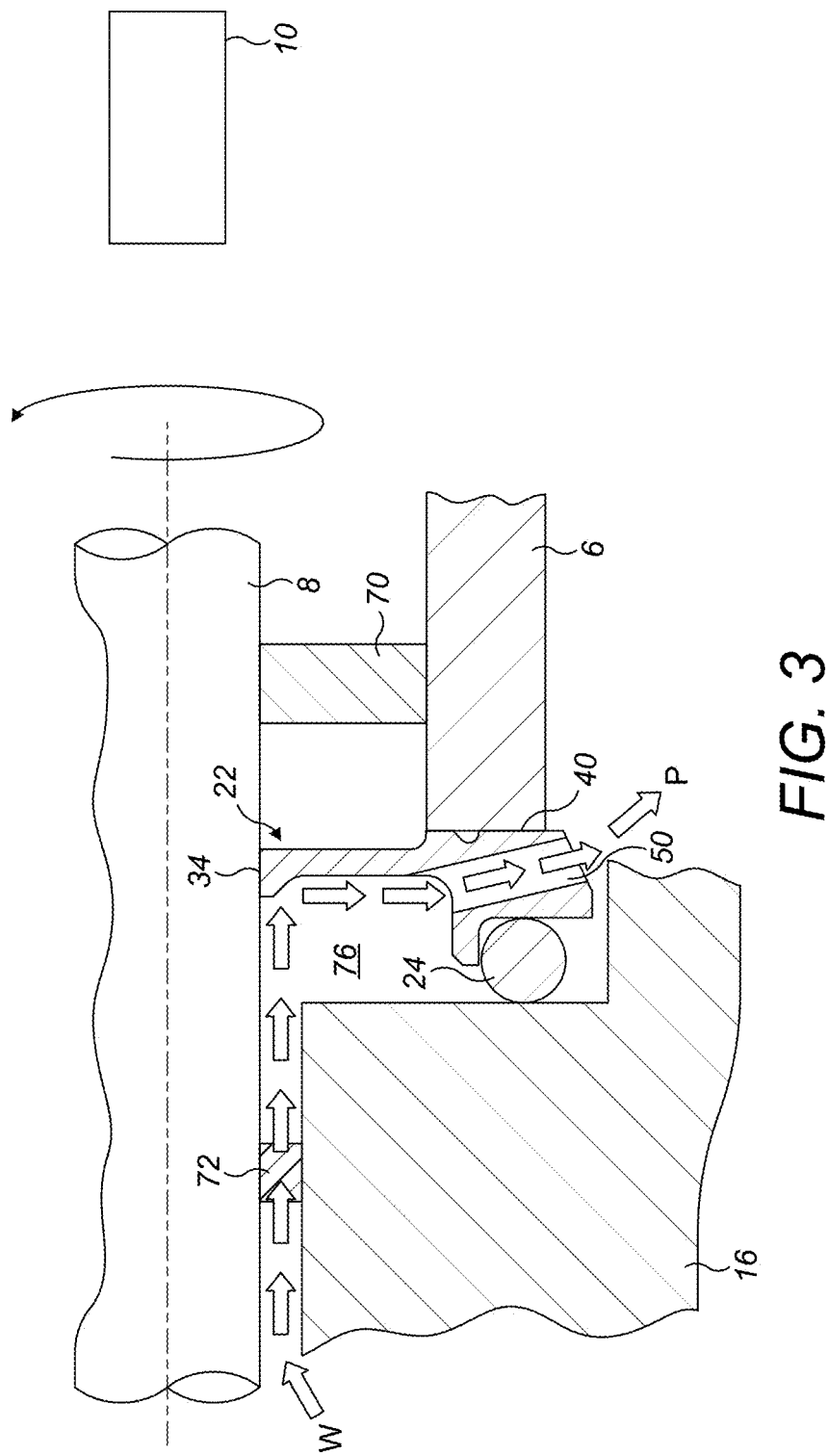
FIG. 3 illustrates a drainage path through the seal element FIG. 2 in use.

The radially outer rim portion 36 also comprises, on the second side 30 of the seal body 26, an axially facing pocket 44 comprising a radially inner, axially extending lip 46 and a radially extending axially facing surface 48. As can be seen in FIG. 1 and FIG. 3, in use the pocket 44 receives the annular elastomeric biasing element 24.

The seal body 26 further comprises at least one drainage passage 50 formed through the outer rim portion 36 from an inlet 52 on the second axial side of the seal body 26 to an outlet 54 on a radially outer portion 56 of the rim portion 36. As will be described further below with reference to FIG. 3, in use, the at least one drainage passage 50 provides a fluid drainage path P from the second axial side 30 of the seal body 26 to the radially outer portion 56 of the rim portion 36 which bypasses the axially facing pocket 44 and the elastomeric biasing element 24.

In this embodiment, a plurality, for example four, drainage passages 50 may be provided. Of course more or fewer drainage passages 50 may be provided. The drainage passages 50 may be circumferentially equi-spaced about the seal body 26, although other arrangements of drainage passages 50 may be used. Providing a plurality of drainage passages 50 will help ensure that there is no pooling of liquid around the seal inner circumference in any potential actuator or valve orientation.

In this embodiment, the drainage passages 50 extend in a direction R having a component from the second axial side 30 of the seal body 26 towards the first axial side of the seal body 26. Thus, as shown in FIG. 2, the drainage passages 50 extend at an angle α to the radial direction R.

In this embodiment, the inlets 52 of the drainage passages 50 are formed at the base of the lip 46 defining the pocket 44. The outlets 54 of the drainage passages 50 are formed in a sloping radially outer surface 58 of the rim portion 36. Other configurations of drainage passages are of course possible, as long as they provide the necessary bypass passage P. For example, the radially outer surface 58 may not be sloped in other embodiments and the drainage passages 50 may extend parallel to the radial direction R.

The seal body 26 may be a one-piece body. The seal body 26 may, for example, be constructed from a relatively low friction material such as PTFE. This will provide a relatively low friction sealing interface between the inner surface 34 of the central opening 32 and the shaft 8. In other embodiments, the seal body 26 may be made in more than one part example of different materials.

As discussed above and as can be seen in FIG. 1 and FIG. 3, the seal body pocket 44 receives an annular elastomeric biasing element 24. In this embodiment, the biasing element 24 is an O-ring of a suitably resilient material, for example silicone rubber. The biasing element 24 is restrained from moving radially inwardly by means of the lip 46 of the pocket 44 and is arranged axially between the radially extending axially facing surface 48 of the pocket 44 and opposed surface 60 of the second static housing 16. The biasing element 24 is compressed in the axial direction between these surfaces 48, 60 when the first static housing 6 is mounted to the second static housing 16. As illustrated schematically in FIG. 1, the first and second static housings 6, 16 may comprise mounting flanges 62, 64 which are clamped together by a clamping ring 66. Of course other forms of coupling may be used, for example releasable fasteners such as nuts and bolts. The dimensioning of the various components is such that when so clamped, the biasing element 24 will be compressed between the axially facing surface 48 of the pocket 44 and the opposed surfaces 60 of the second static housing 16. This axial compression biases the axially facing annular sealing surface 38 of the seal element 22 into sealing contact with the annular surface 40 of the first static housing 6. It also prevents leakage of fluid around the outer periphery of the seal element 22.

As further illustrated in FIG. 1, first and second additional seals 70, 72 are provided between the first static housing 6 and the rotary shaft 8 and the second static housing 16 and the rotary shaft 8 respectively. These additional seals 70, 72 are intended to reduce any flow of fluid into the rotary actuator 4 from the duct 14 along the shaft 8. A bearing 74 for the shaft 8 may also be provided in the second static housing 16 as illustrated schematically in FIG. 1. In other arrangements, a bearing may instead or additionally be provided in the valve housing 16 on the opposite side of the valve element 12. In other arrangements, a bearing may be instead or additionally provided in the actuator housing 6 to the right of the first additional seal 70.

Operation of the above system will now be described.

As briefly mentioned above, in certain circumstances, fluid, for example condensed water may attempt to flow from the duct 14 along the shaft 8 between the first and second housings 6, 16 and into the rotary actuator 4. The additional seals 70, 72, may themselves prevent some flow of fluid, but in the event of the water freezing and thawing, the seals 70, 72 may remain at least partially frozen due to the thermal mass around them, even after the water has thawed which may lead to the effectiveness of the seal being compromised which in turn means that water may penetrate the first static housing 6 and possibly adversely interfere with components of the actuator such as electronic components 10. The sealing arrangement 20 of the present disclosure is intended to mitigate such problems and reduce significantly or avoid penetration of water into the first static housing 6.

As will be seen from FIG. 3, for example, water W may flow along the shaft 8 through the second additional seal towards the first additional seal 70. However, the seal element 22 of the disclosure reduces or prevents such flow. The inner periphery 34 of the central opening 32 of the seal element 22 forms a dynamic seal with the shaft 8. This reduces or prevents flow of water W along the shaft 8 towards the first additional seal 70. Water W is diverted away from the shaft and flows radially outwardly along the second side 30 of the seal element 22 towards the drainage passages 50. Water W is prevented from flowing around the annular biasing element 24 due to the contact thereof with the annular surfaces 48, 60 of the seal element 22 and second static housing 16. Were it not for the drainage passages 50, water would accumulate in the space 76 between the seal element 22 and the second static housing 16. However, the drainage passages 50 permit water to drain from that space 76 to the outer circumferential surface 56 of the seal element 22 radially outwardly of the surface 40 of the first static housing 6. From there, the water may be routed to atmosphere through suitable openings or evaporation. The drainage passage 50 also prevents a pressure build-up in the space 74 and permits pressure equalisation with the surroundings, thereby reducing pressure loading on the second additional seal 72.

Ingress of water from the outer circumferential surface 56 of the seal element 32 into the first static housing 6 is prevented by the sealing engagement between the between the axially facing annular sealing surface 38 provided on the first axial side 28 of the seal body 32 and the opposed surface 40 of the adjacent first static housing 6. To improve the seal between these 2 components, grease may be provided in the grooves 42 in the axially facing annular sealing surface 38 of the seal element 32. This seal will, normally, be a static seal, since the friction between the opposed surfaces 38, 40 will generally be sufficient to prevent rotation of the sealing element 22 due to its interaction with the rotating shaft 8 at the inner central opening 32.

It will be understood that the description above is of an exemplary embodiment of the disclosure and that modifications may be made thereto without departing from the scope of the disclosure. For example, while the seal element has been described in the context of a rotary valve actuator, an air conditioning system, it may be used in other applications in which water or fluid requires removal from the system.

It will also be understood that, in the disclosed embodiment, the radially inner lip 46 of the pocket 44 is circumferentially continuous. However, this is not essential and the lip (46) may be formed with a plurality of circumferentially spaced sections which will still locate the biasing element 24 radially. Yet further embodiments, the pocket 44 may be formed as a groove in the second side 30 of the rim portion 36. The axially facing surface 48 of the pocket 44 may not be planar as illustrated but may be curved, provided it includes an axially facing portion.

Thus, it will be seen that embodiments of the disclosure provide an advantageous arrangement which will reduce or prevent ingress of moisture to sensitive electronic components in a rotary actuator. The disclosed embodiment has no moving parts and is therefore potentially highly reliable. The system may easily be provided with mistake proofing features to avoid installation of the seal element in an incorrect orientation. The disclosure can be applied to new installations or as a retrofit to existing installations. It may easily be installed using standard tools and fasteners and may easily be adapted to various applications by suitable sizing.

The invention claimed is:

1. A rotary sealing arrangement comprising:
   a first static housing comprising a first axially facing sealing surface;
   a second static housing comprising a second axially facing surface;
   a rotary shaft extending axially through the first and second static housings;
   a rotary seal arranged between the first and second static housings, the rotary seal comprising a seal element comprising a disc-shaped body having a first axial side and an opposed second axial side, the seal element further comprising:
   a radially inner central circular opening for receiving the rotary shaft, the opening having an inner periphery directly engaging the shaft;
   a radially outer rim portion, the radially outer rim portion having:
      an axially facing annular sealing surface provided on the first axial side for sealing engagement with the axially facing sealing surface of the first static housing;
      an axially facing pocket provided on the second axial side and having an axially facing surface; and
   at least one drainage passage formed through the outer rim portion from an inlet on the second axial side to an outlet on a radially outer portion of the rim portion to provide a fluid drainage path P through the rim portion by passing the axially facing pocket,
   the rotary sealing arrangement further comprising an annular elastomeric biasing element received in the pocket; and wherein:
   the inner periphery of the seal element forms a dynamic seal with the shaft; and
   the annular elastomeric biasing element is axially compressed between the axially facing surface of the pocket and the axially facing surface of the second housing thereby biasing the axially facing annular sealing surface of the rim portion of the seal element into sealing engagement with the first axially facing sealing surface of the first static housing.

2. A rotary sealing arrangement as claimed in claim 1, the rotary seal comprising a plurality of drainage passages arranged circumferentially therearound.

3. A rotary sealing arrangement as claimed in claim 2, the rotary seal comprising at least four drainage passages arranged circumferentially therearound.

4. A rotary sealing arrangement as claimed in claim 2, wherein the drainage passages are circumferentially equi-spaced around the seal element.

5. A rotary sealing arrangement as claimed in claim 1, wherein said axially facing pocket comprises a radially inner, axially extending lip.

6. A rotary sealing arrangement as claimed in claim 5, wherein the drainage passage inlet is formed at the base of the axially extending lip.

7. A rotary sealing arrangement as claimed in claim 1, wherein the axially facing annular sealing surface comprises an annular groove formed therearound.

8. A rotary sealing arrangement as claimed in claim 1, wherein the at least one drainage passage extends at an angle (α) to a radial direction (R).

9. A rotary sealing arrangement as claimed in claim 1, wherein said seal body is made from Polytetrafluoroethylene (PTFE) or a PTFE based material.

10. A rotary sealing arrangement as claimed in claim 1, comprising a first additional seal between the first static housing and the shaft and a second additional seal between the second static housing and the shaft, the seal element being arranged between the first and second additional seals.

11. A rotary sealing arrangement as claimed in claim 1, comprising a clamping element for clamping the first static housing to the second static housing, thereby compressing said annular elastomeric biasing element.

12. A rotary actuator system comprising:
a rotary actuator,
a rotary valve element; and
a rotary sealing arrangement as claim 1, wherein the rotary valve element is coupled to the rotary shaft and further comprising an annular elastomeric biasing element received in the pocket; wherein:
the rotary shaft is driven by the rotary actuator; and
the rotary actuator comprises the first static housing, the rotary valve comprises the second static housing and the seal element engages the rotary shaft.

13. A rotary actuator system as claimed in claim 12, wherein said rotary valve element is a butterfly valve.

14. An aircraft air conditioning system comprising a rotary actuator system as claimed in claim 12 for controlling flow of air therein.

* * * * *